United States Patent [19]

Ardissone

[11] Patent Number: 4,978,407
[45] Date of Patent: Dec. 18, 1990

[54] METHOD FOR PRODUCING LAMINATED PANELS HAVING FOLDS

[75] Inventor: Alberto Ardissone, Principality of Monaco, Monaco

[73] Assignee: Polistock N.V., Netherlands

[21] Appl. No.: 370,739

[22] Filed: Jun. 23, 1989

[30] Foreign Application Priority Data

Jun. 24, 1988 [GB] United Kingdom ............... 8815101

[51] Int. Cl.$^5$ .............................................. B32B 31/16
[52] U.S. Cl. ..................................... 156/216; 156/227; 156/242; 264/248; 428/68; 428/124; 428/130
[58] Field of Search ............... 156/202, 213, 214, 216, 156/227, 242; 264/241, 248, 249; 428/68, 121, 124, 130

[56] References Cited

U.S. PATENT DOCUMENTS 4,243,456 1/1981 Cesano ................................ 156/214
4,385,090 5/1983 Sims .................................... 428/121

FOREIGN PATENT DOCUMENTS 2195940 4/1988 United Kingdom .

Primary Examiner—Robert A. Dawson
Attorney, Agent, or Firm—Wigman & Cohen

[57] ABSTRACT

A method of producing a laminated panel having a backside formed of a normally rigid substrate, such as a polymer/filler composition, in an essentially self-supporting thickness of typically between 1 and 10 mm and a frontside formed of a differentially segmented cover layer, e.g. having segments of differing materials and/or colors, bonded to said substrate by laminatingly interconnecting, typically at elevated temperatures and pressures, a layer of said substrate in a moldable, e.g. thermally plastified state and a differentially segmented sheet for forming said cover layer; the sheet has at least one seam line between adjacent segments; in order to compensate the effects of an off-set between the position of the seam line of the segmented sheet and the desired position of the seam line between segments of the laminated panel the novel laminating method includes the step of forming a fold to protrude from the backside of the final laminate; the fold consists of a folded double layer of the segmented sheet as an inner fold portion and of an outer fold portion formed of the substrate; the folded double layer has a length corresponding to at least about 100%, typically between 100 and 300%, of the self-supporting thickness of the substrate and embeds the seam line of the segmented sheet within the fold so that the visible junction between differing segments on the frontside will be defined by the visible end of the folded double layer.

8 Claims, 3 Drawing Sheets

METHOD FOR PRODUCING LAMINATED PANELS HAVING FOLDS

BACKGROUND OF THE INVENTION (1) Field of the Invention

The present invention relates to laminated materials of the type suitable for use as panels, e.g. as interior door panels of cars or other vehicles, or as furniture elements and similar uses.

(2) Description of the Prior Art

Generally, such panels have a structural as well as a decorative function and are made as disclosed e.g. in U.S. Pat. Nos. 4,243,456, 4,328,067 and in GB No. 2,195,940 by press-molding a substrate layer or sheet of a normally rigid, i.e. non-pliable, thermoplastic material having a typical thickness between about 1 and 10 mm and a cover layer sheet of a normally pliable decorative material. Examples of suitable materials for both the thermoplastic substrates, e.g. polypropylene/wood particle composites, as well as for the cover material layers, e.g. polymer sheeting and textile materials, are given in the patents mentioned above. The sheet of the thermoplastic substrate material that is introduced into the laminating and molding press in a heat-plastified state is shaped while, simultaneously, the sheet of the cover layer material is bonded to the substrate that is being formed in the press. Thus, molding and lamination is effected in a one-step process and the bonding action is frequently but not necessarily due to the adhesive effect of a thermoplastic constituent of the substrate when in a heat-plastified state.

Two specific problems have to be resolved when operating such methods: one is "edge-covering", i.e. coating or camouflaging of the panel edge, for instance by an overlapping edge portion of the decorative cover layer that is folded around the edge and affixed to the backside of the panel.

The other problem arises when the decorative cover layer has two or more segments of differing color and/or texture, such as when a polymer sheeting of a given color, shade or hue should cover one part of the panel while a textile layer having the same or a differing color, shade or hue and a differing texture, e.g. the feel and appearance of velvet or cloth, should cover another part of the panel, and when the differing segments are to cover rather well-defined specific portions of the panel surface as determined by aesthetic necessity or/and product design.

For the purpose of the invention, a cover layer having two or more segments of differing visual and/or tactile appearance will be termed a "differentially segmented cover layer" or "segmented cover" for brevity; in analogy, the sheet material used for producing such a cover layer will be termed "differentially segmented sheet" or "segmented sheet". Adjacent segments of the segmented sheet will be connected by a "seam" that may have the form of a straight or curved line, or it may be a branched or looped line or have any other configuration depending upon number, shape and position of the segments that form the sheet and the term "seam line" as used herein is intended to include seam configurations independently of shape and without regard to the method used for forming the seam, e.g. by physical means including adhesion with or without adhesives, sewing, welding, or chemical means including interfusion cross-linking, etc.

Generally, the actual seam line(s) of the segmented sheet should be brought "into register" or made to "coincide" with a predetermined or theoretical seam line position on the panel, e.g. along a certain line in a plane, or along a certain contour of a spatial shape; an illustrative example is an armrest of a door panel where, for example, the horizontal armrest portion is to consist of velvet for comfort while the vertical side of the armrest, or a lower panel portion, is to consist of en embossed plastics material, e.g. for high wear resistance. Consequently, the problem is how to get the seam line, or lines, of the sheet used to form the cover layer to coincide with its predetermined or theoretical position on the final laminated panel.

One general prior art method of getting the seam line of a segmented cover sheet into a predetermined position on the "frontside" (i.e. the panel side intended for visual and/or tactile exposure) consists of pre-connecting the seam line portion of the cover sheet with the substrate layer before actually connecting the main portion of the cover sheet and the substrate, with or without simultaneously shaping the resulting panel. Such a method will be termed a "seam fixing method" hereinafter and a prior art example of such a method using clamp means for seam fixing is disclosed in DE No. 31 09 338.

However, seam fixing will have an advantageous effect only if—before actual fixing—the seam line of the segmented sheet for forming the cover layer is brought into register with its theoretical position on the molded or mold-supported substrate. Considering the realities of mass-producing such items as interior panels for use in furniture or cars, trucks, busses, ships, planes, etc., it will easily be understood that off-register positions, also termed "off-set" positions, of the seam line before seam fixing cannot always be prevented and will lead to production losses or low quality products.

OBJECTS OF THE INVENTION

Accordingly, it is a main object of the present invention to provide for a method of producing laminated panels having segmented cover layers by seam fixing of a segmented sheet on the substrate layer in such a manner that even a significant off-set position of the seam line of the sheet relative to the theoretical position on the laminated panel will still yield a laminated product where the line actually formed by adjacent segments on the cover layer will be exactly in the predetermined position on the final panel as required or desired in view of the intended shape and/or design of the laminated panel even if the seam line(s) of the segmented sheet will be "off-set" in the laminating mold, i.e. significantly displaced relative to the predetermined position of the junction between adjacent segments.

Another object of the invention is an apparatus for carrying out this method.

Yet a further object of the invention is a novel edge covering method that may, but need not, be carried out in conjunction with the novel method of this invention.

Still further objects will become apparent as the specification proceeds.

SUMMARY OF THE INVENTION

Now, in order to achieve the above objects, the invention in a first preferred embodiment thereof provides for a method of producing a laminated panel having a backside formed of a normally rigid substrate in an essentially self-supporting thickness and a frontside formed of a differentially segmented cover layer bonded to the substrate by moldingly interconnecting a layer of the substrate in a moldable state and a differentially segmented sheet for providing the cover layer; the segmented sheet has at least two differing segments and at least one seam line between adjacent segments; this embodiment of the invention is characterized by the step of forming, in a portion of the panel corresponding essentially to a predetermined position of the visible junction line between the differing segments on the frontside of the laminated panel, a fold to protrude from the backside of the final laminated panel and comprising a folded double layer of the segmented sheet as an inner fold portion and an outer fold portion formed of the substrate; the folded double layer has a length corresponding to at least about 100% of the self-supporting thickness of the substrate and includes the seam line of said segmented sheet within the fold.

Consequently and in contrast with prior art methods, the actual junction line or lines between adjacent segments of the cover layer (as visible on the surface of the resulting laminated panel) need not, and normally will not, coincide with the seam line(s) of the cover sheet because that seam line(s) is(are) embedded in the laminated panel and, hence, not visible at the surface thereof. As a result, even a significant off-set between the position of the seam line(s) of the segmented sheet within the mold which is used for lamination and shaping and the predetermined position of visible junction line(s) on the laminated panel may be compensated as long as the length of the folded double layer within the fold is selected appropriately. Generally, such an off-set will be considered "significant" if the distance between the theoretical position of the line(s) of segment junction and an actual position of the seam line is several times greater (e.g. by a factor of typically from about 2 to about 100) than the thickness of the cover layer. Even such an off-set would normally be considered to be "excessive" but can be compensated almost indefinitely according to the invention: while the dimension of the fold may be limited by practical considerations, there is no critical upper limit for its length and, hence, its inherent capacity to compensate off-set because it presents no problem at all to bendingly or otherwise deform a long backside protrusion of the fold so as to conform with overall shape requirements of the laminated panel.

According to a second preferred embodiment, the invention (that may be carried out in conjunction with the first embodiment or independently thereof) provides for a novel edge-covering method in which a laminated panel is produced by shaping and laminating a substrate layer with a normally pliable sheet, segmented or not, for forming a cover layer on said substrate layer; this method comprises the steps of providing an integral peripheral flange of the laminated panel; the flange is formed of a peripheral portion of the cover layer and of a peripheral portion of the substrate layer having a reduced thickness; then, the peripheral flange is bendingly shaped while its substrate portion is in a temporary pliable state to provide an at least partially crimped edge of the panel when the flange is held in a permanently bent position; visual edge covering is provided when the temporary pliable state of the substrate material is reversed.

According to a third preferred embodiment, the invention provides for an apparatus suitable for producing at least one laminated panel having a backside formed of an essentially rigid substrate and a frontside having a cover layer exhibiting segments formed by a differentially segmented sheet having at least two differing segments and at least one seam line between adjacent segments; the apparatus comprises at least one molding die having a male die portion and a female die portion for relative movement between an open die position and a closed die position; the male die portion comprises, in operative connection therewith, an elongated recess corresponding essentially to a predetermined position of a visible junction line between the segments of the cover layer; the female die portion comprises, again in an operative connection therewith, an elongated protrusion interfitting positionally with the elongated recess when the die portions are in closed position; the elongated recess is dimensioned, i.e. dimensionally shaped, so as to receive a fold of the panel extending outwardly (i.e. generally away) from the panel backside; the fold includes an inner double layer of the cover sheet embedded by a portion of the substrate layer; the protrusion operatively connected to the female die portion, on the other hand, has a width and length for engaging the upper surface of the segmented sheet and for forming the fold when moved into the recess of the male die portion while leaving intact the fold thus formed when retracted from the interfitting position; further, the apparatus includes means to cause relative movement of the male die portion and the female die portion for repeating the operating cycle of the mold portions.

Further apparatus means may be added as needed.

DISCUSSION OF PREFERRED EMBODIMENTS

Referring to the substrate for use in the inventive method, the term "normally rigid" applies to materials known in the art for forming panels which will be "self-supporting" in the sense of supporting, without substantial deformation, their own weight as well as stresses or loads normally expected for the specific type of panel; preferably, the substrate is formed of at least one thermoplastic synthetic polymer (this includes copolymers, mixtures, etc.) and at least one filler, structural or not, as is known in the art per se. A typical self-supporting thickness of panels or layers of such materials will be in the range of from about 1 to about 10 mm.

The segmented sheet is preferably made of segments that consist of normally pliable materials, such as fibrous layers (including woven, non-woven, knit or carpet-type goods, velvets, etc.) man-made (i.e. synthetic) leather, natural leather, films of synthetic polymers, and structured polymer layers (including layered, foamed and other structures known to be suitable as cover layers for panels); normally, the segments and the sheet will have a "gauge" or thickness not exceeding that of the substrate layer but this is not believed to be critical. Typical gauges will be in the range of from 0.1 to 2 mm. Preferably, the sheet is made of materials that have some resilience; heat resistance of the sheet is desirable but cooling means may be used to prevent undesired deformation or melting upon lamination. It should be noted that the backside of the laminated panel may either be that of the substrate layer, or it may be coated or covered with one or more layers as required for a specific type of laminated panel.

For many purposes of the invention it is preferred that the cover layer is bonded to the substrate at a more or less well-defined interface formed either by direct and adhesive contact of substrate and cover layer, or by an intermediate layer formed of an adhesive or of a separate melt-bonding layer. Frequently, the fold will be formed in a seam-fixing step, e.g. in a first portion of the interface positionally corresponding to the predetermined portion of the visible junction line; then, lamination is completed throughout a second and substantially residual portion of the interface.

The fold formed in the course of the inventive method will have a typical thickness (measured on the portion that protrudes from the backside of the panel) corresponding to about 150% to about 250% of the self-supporting thickness of the support layer; the length of the folded double layer of the segmented sheet will typically be in the range of from about 100% to about 500% of the self-supporting thickness of said substrate, e.g. between 1 and 50 mm.

When carrying out edge covering as taught herein, the substrate material should be thermoplastic so that the peripheral flange of the panel can be formed in a one-step operation together with the lamination-and-molding step; the bending step for producing the crimped edge, on the other hand, can be carried out as a separate step (after reheating the flange if necessary). The bent flange will remain in its position as soon as it cools, or is cooled, to a temperature below the softening temperature of the substrate material. It should be noted here that prior art edge-coating methods as disclosed, e.g. in U.S. Pat. Nos. 4,348,448 and 4,385,090, require that the flange portion after bending it around the edge of the laminate is physically connected to the backside of the laminate, such as by welding or glueing. In contrast, the inventive edge covering method does not need such physical connection so that production may be simplified substantially. Generally, the flange will be bent to form a crimping angle ($\alpha$) in the range of from about 30° to about 180°.

Preferred features of the novel apparatus will be explained in more detail below. It should be noted, however, that many prior art lamination-and-molding apparatus will be suitable for use in the present invention if their mold portions can be modified to include the combination of recess and protrusion required to form the fold is explained herein. In this connection, the term "operative connection" referring to the elongated recess on the male die and the interfitting elongated protrusion of the female die portion is intended to include that the recess as well as the protrusion can be a fixed portion of the corresponding mold portion, or that either is part of a separately moveable die portion, e.g. a spring-loaded mold insert. Preferably, the recess has the form of a groove with a round bottom which, in turn, may be connected with a vacuum source as is conventional in molding methods. The shape of the recess will, of course, be dictated essentially by the desired shape and dimension of the fold. The protrusion, on the other hand, preferably is as thin as possible so as to facilitate retraction without deforming the fold, and should have a blunt or rounded front edge so as not to damage the segmented sheet when engaging therewith. In general, both the apparatus and the method for producing laminated panels having a differentially segmented cover layer are of particular use when the panel has a "tridimensional" shape or contour, i.e. if the panel is not essentially flat but bulges out of a plane.

BRIEF DESCRIPTION OF THE DRAWINGS

The invention will now be explained in more detail with reference to the drawings which are not intended to limit the invention, and in which.

DETAILED DESCRIPTION OF THE PREFERRED EMBODIMENTS

Describing now the drawings, it is to be understood that only enough of the construction of the apparatus features is shown as needed for those skilled in the art to understand the principles and concepts of the present invention while simplifying the showing of the drawings.

Figure 1:
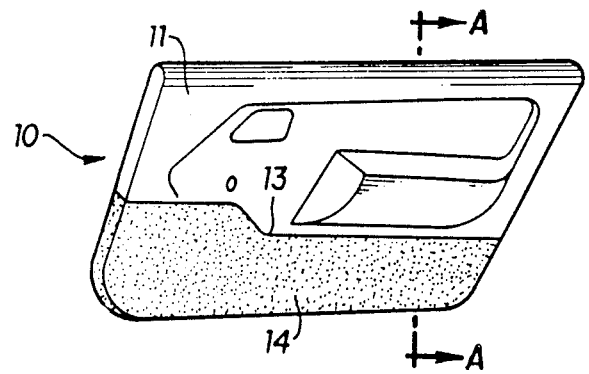
FIG. 1 is a perspective and simplified view of a laminated panel of the type obtainable according to the invention.

Turning attention now specifically to FIG. 1 of the drawing, panel 10 represents a simplified rendering of the frontside of a typical profiled door panel for use in automobiles and including an armrest protrusion as well as openings for ashtray and door opening/window lifting means.

The cover layer of the laminated panel consists of two distinct segments; the upper segment 11 of the cover layer extends from an outwardly bulged panel portion near the door-window (not shown) and over the protruding and the recessed door portions to junction line 13; typically, segment 11 consists of a polymer sheet, e.g. selected from the vinyl group and optionally having a foamed internal and an embossed outer structure. The lower segment 14 consists of a different material, e.g. a textile material such as velvet. The color of segments 13, 14 may be the same or different.

Figure 2:
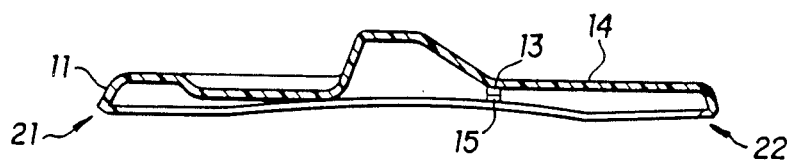
FIG. 2 is a sectional view along line A—A of the panel shown in FIG. 1.

FIG. 2 is a sectional view along line A—A of FIG. 1 to show a ridge-like protruding portion 15 of an off-set-compensating fold at the backside of panel 10 produced according to the invention and additionally reinforcing panel 10 as well as making it more vibration-resistant or -dampening; upper and lower edges 21, 22 of the panel would roughen and spoil the smooth appearance of the covering layer.

Accordingly, such edges may be covered as shown in FIGS. 3A to 3E.

Figure 3A:
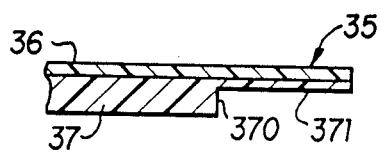
FIGS. 3A, 3B, 3C, 3D and 3E are diagrammatic sectional views of the broken-away flange portion of a panel according to the invention in an uncrimped shape (FIG. 3A) and in partially or fully crimped shapes (FIGS. 3B to 3E)
Figure 3B:
Figure 3C:
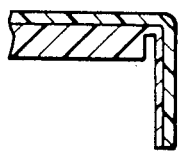
Figure 3D:
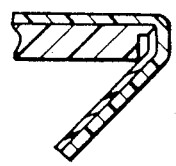
Figure 3E:

FIG. 3A is a diagrammatic and enlarged sectional view of a flange 35 formed of an upper portion of cover layer 36 and a lower portion 371 which is an integral but reduced portion of the substrate layer 37. Portion 371 is substantially rigid. Under the impact of heat, say in the temperature range typical for processing of structural thermoplastic polymer compositions of from about 150° to about 250° C., the lower layer 371 will soften and permit bending flange 35 as shown in FIG. 3B, e.g. to a partial crimp angle α of about 30°. Upon cooling of the partially crimped flange the lower layer of the thermoplastic substrate material will again become rigid or "set". Preferably, crimping of flange 35 will not be stopped at such a low crimping but be continued until a crimp angle of at least about 90° is reached. Frequently, crimping will be continued until a substantially full crimp of 135°–180° is achieved before setting. As is seen in FIGS. 3D and 3E, a crimped flange 35 will hold the covering layer in a permanently bent position without any particular adhesive or sealing means for holding the pliable cover material to the panel backside yet assuring visual cover of the substrate edge 370 without actually coating or contacting the same.

Figure 4:
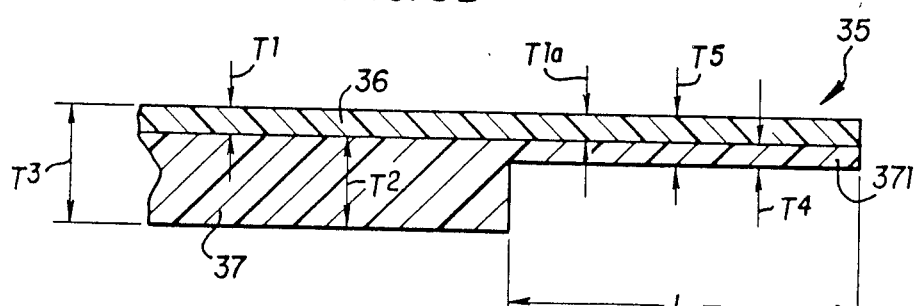
FIG. 4 is an enlarged view of the uncrimped flange as illustrated in FIG. 3A to show essential dimensions of the flange.

FIG. 4 is an enlarged view of the flange of FIG. 3A shown to illustrate typical dimensions of the flange; for example, the thickness or gauge $T^1$ of the cover layer may be in the range of from about 1 to about 2.5 mm while the thermoplastic substrate layer 37 will have a thickness $T^2$ of from about 2 to about 3 mm; hence, a typical total thickness $T^3$ of the panel may be in the range of from about 2 to about 6 mm. The thickness $T^{1a}$ of the cover layer in the region of flange 35 may, but need not, be the same as $T^1$ because some compressive deformation of cover layer 36 may occur when the flange is formed. The combined layer thickness $T^5$ of the flange portion will be in the range of from about 1 to about 2.5 mm. While none of the just mentioned gauges is believed to be overly critical, the thickness $T^4$ of the substrate in flange 35 is of some importance and will typically be in the range of from about 0.1 to about 0.5 mm; this parameter should take into account the elasticity or shape-recovering properties of the cover layer because flange 35 should permanently hold layer 36 at the selected crimp angle.

The length L of flange 35 will frequently be at least twice the thickness $T^3$ and a preferred range of L is between 8 and 12 mm and a simple test for selecting appropriate parameters for a given substrate and coyer material is to determine the "flex count" of that combination in a flange having a length L of 50 mm and applying a test load of 10 Pa at a distance of 25 mm from the flange end. With a sample width of 50 mm (i.e. in a square test flange portion), the deflection or "temporary" angle α from the unloaded position should generally be less than 10°.

A suitable rigidity of flange 35 in terms of the flex count just described should be obtained at a thickness $T^4$ of less than about 0.5 mm and preferably below 0.3 mm. A preferred thickness for $T^4$ is in the range of from 0.05 to 0.2 mm.

Figure 5A:
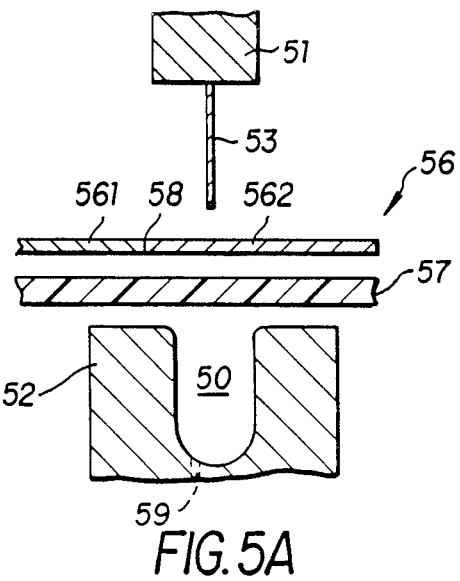
FIGS. 5A, 5B and 5C are enlarged diagrammatic sectional views of the die elements according to the invention for producing a fold that compensates seam line off-set.
Figure 5B:
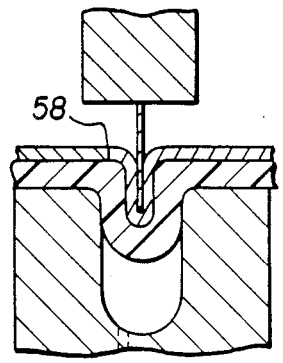
Figure 5C:
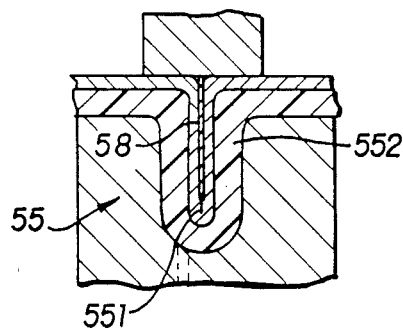

FIGS. 5A, 5B and 5C are diagrammatic sectional views to illustrate producing an off-set compensating fold 55 by cooperation of protrusion 53 on a portion 51 which is in operative connection with a female die portion (not shown) of a laminating-and-molding press (not shown). The elongated (longitudinal extension not shown) protrusion 53 fits positionally (over its length, not shown) into elongated recess or groove 50 of a portion 52 which is in operative connection with a male die portion (not shown).

Upon relative movement of portion 51 towards portion 52, protrusion 53 engages with sheet 56 that has a first segment 561, e.g. of velvet, and a differing segment 562, e.g. of a plastic sheeting, connected by seam 58 which, of course, extends longitudinally as apparent from FIG. 1.

Upon further movement of protrusion 53 towards recess 50 as shown in FIGS. 5B and 5C, a fold 55 will be formed in recess 50. As is apparent from FIG. 5C, seam line 58 (significantly off-set in FIG. 5A) is part of double layer 551 embedded by substrate portion 552 as soon as protrusion 53 is withdrawn. Because of normal resilience of the materials of segments 561, 562 of sheet 56, fold 55 will remain intact. Protrusion 53 may be coated (not shown) with a release layer, e.g. made of a florinated hydrocarbon, for instance a teflon.

Die portion 58 may be provided with a vent means 59 to prevent formation of an air cushion.

When protrusion 53 is removed from recess 50 and fold 55 formed therein, the visible junction line between the differing sheet segments 561, 562 on the frontside of the panel after setting of substrate layer 57 will be exactly in the position defined by protrusion 53 and recess 50 elongated even though the seam line position 136 (FIG. 5A) was off-set when sheet 56 was placed into the molding press.

Figure 6:
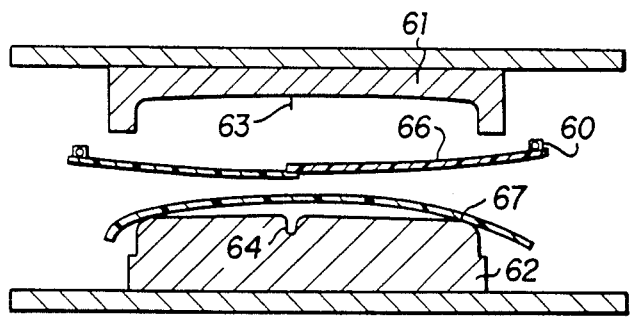
FIG. 6 is a diagrammatic sectional view of the die portions in an open position.
Figure 7:
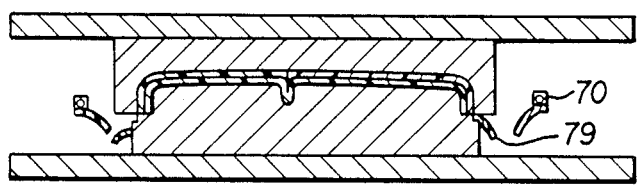
FIG. 7 shows the die portions of FIG. 6 in closed position.

FIGS. 6 and 7 show a simplified sectional view of a laminating press for segmented cover layers joined by a seam line for compensating off-set thereof. Lower or male die portion 62 is provided with a groove recess 64 while upper or female die portion 61 is provided with an elongated protrusion 63, e.g. a dull blade. A sheet of hot thermoplastic substrate 67 is placed onto male die portion 62 while segmented sheet 66 is held by a frame 60. The molding-and-laminating press of FIG. 6 is closed and the fold for compensating seam line off-set is produced in the manner shown in FIGS. 5A to 5C.

Figure 8:
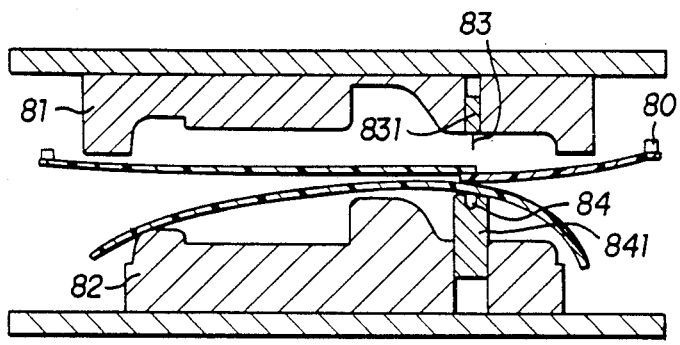
FIG. 8 is a diagrammatic sectional view of a modified form of the die portions of the apparatus features illustrated in FIGS. 6 and 7.
Figure 9:
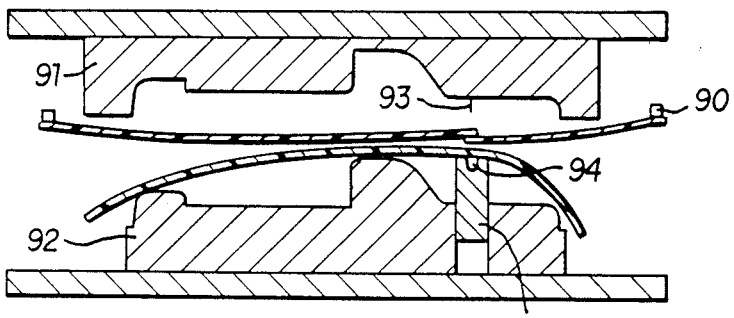
FIG. 9 is a diagrammatic sectional view of a further modification of the die portions of the apparatus shown in FIG. 8.

The molding-and-laminating press illustrated only in open positions in FIGS. 8 and 9 shows some other ways of operatively connecting protrusions 83, 93 indirectly or directly with an upper or female mold portion 81, 91 and operatively connecting groove 84, 94 with male die portion 82, 92. Slideable mold portions (actuating means such as springs not shown) 831, 841 and 941, respectively, are shown to diagrammatically illustrate several types of operative connections of the elongated protrusions 83, 93 to female die portions 81, 91 while groove recess 84, 94 is in operative connection with male die portion 82, 92 via sliding mold portions 841 and 941. Inverse arrangements, i.e. with a non-sliding groove recess and a slidingly mounted protrusion would be feasible as well.

Many modifications of the above embodiments will be apparent to those skilled in the art of lamination on the basis of the above specific illustration and it is emphasized that the embodiments of the invention shown in the drawings are intended but for illustration and not for limitation. For example, various materials or "cover stocks" can be used for the segments of the cover layer, or sections thereof, e.g. natural or man-made pliable leather or suede, cloth, woven or non-woven fabrics of natural or synthetic fibers and pliable polymer sheet of web materials commercially available. The term "pliable" is intended to include such materials as can be folded back on themselves repeatedly without breaking or rupturing.

Further, more than two differing segments can be used in the cover layer including enclosed segments or "islands" defined by an "endless", i.e. closed seam line. For example, the armrest portion of the door of FIG. 1, or any part of segment 11, could be made of a third, fourth or fifth differing segment, i.e. differing from either or both segments 11, 14 of FIG. 1, and a number of five differing segments is given but as an example since there is no limit to the number of segments. In fact, it is a substantial advantage of the invention that even a very intricate pattern of segments can be positioned such that all function lines will be in predetermined positions even though some or all seam lines of the segmented sheets are off-set.

Examples of suitable substrate materials as well as molding conditions (temperatures, pressures, cycle periods) and further parameters, e.g. profile depth, are given in the above mentioned U.S. Patents and the art cited therein and, again, many modifications will be apparent to those skilled in the molding art.

While there are shown and described preferred embodiments, it is distinctly understood that the invention is not limited thereto, but may be otherwise variously embodied and practiced within the scope of the following claims.

What I claim is:

1. A method of producing a laminated panel having a backside formed of a normally rigid substrate in an essentially self-supporting thickness and a frontside formed of a differentially segmented cover layer bonded to said substrate by moldingly interconnecting a layer of said substrate in a moldable state and a differentially segmented sheet for providing said cover layer; said segmented sheet having at least two differing segments and at least one seam line between adjacent segments; the improvement comprising the step of forming, in a portion of said panel corresponding essentially to a predetermined position of the visible junction line between said differing segments in said frontside of said laminated panel, a fold to protrude from said backside and comprising a folded double layer of said segmented sheet as an inner fold portion and an outer fold portion formed of said substrate; said folded double layer having a length corresponding to at least about 100% of said self-supporting thickness of said substrate and including said seam line of said segmented sheet within said fold so as to compensate an off-set between said seam line of said segmented sheet and said predetermined position of said visible junction line on said laminated panel.

2. The method of claim 1 wherein said substrate is formed of a thermoplastic synthetic polymer and at least one filler, and wherein said moldable state of said substrate layer is achieved by said layer having a temperature above the softening temperature of said polymer, and wherein said self-supporting thickness is in the range of from about 1 to about 10 mm.

3. The method of claim 1 wherein said segmented sheet is made of differing segments each consisting of a normally pliable material selected from fibrous layers, man-made leather, natural leather, films of synthetic polymers, and structured polymer layers, said sheet having a thickness not exceeding that of said substrate layer.

4. The method of claim 1 wherein said cover layer is bonded to said substrate at an interface and wherein said fold is formed in a first portion of said interface corresponding to said predetermined portion of said visible junction line prior to interconnecting said substrate layer and said segmented sheet at a second and substantially entire residual portion of said interface.

5. The method of claim 1 wherein said fold has a protruding thickness corresponding to about 200 to 250% of said self-supporting thickness of said substrate and wherein said folded double layer of said segmented sheet has a length in the range of from about 100% to about 500% of said self-supporting thickness of said substrate.

6. The method of claim 1 comprising the steps of providing an integral peripheral flange of said panel formed of a peripheral portion of said cover layer and of a peripheral portion of said substrate having a reduced thickness, and of bendingly shaping said peripheral flange while said substrate portion thereof is in a temporary pliable state to provide an at least partially crimped edge of said panel held in a permanently bent position and providing visual edge covering when said temporary pliable state of said substrate material is reversed.

7. The method of claim 6 wherein said substrate is thermoplastic and wherein said temporary pliable state of said substrate portion of said peripheral flange is achieved by heating whereas said temporary pliable state of said substrate material is reversed by cooling.

8. The method of claim 7 wherein said flange is bent to form a crimping edge ($\alpha$) in the range of from about 30° to about 180°.

* * * * *